(12) United States Patent
Shirataki et al.

(10) Patent No.: US 6,435,326 B2
(45) Date of Patent: Aug. 20, 2002

(54) END BEARINGS FOR ONE-WAY CLUTCH, MANUFACTURING PROCESS THEREOF, AND ONE-WAY CLUTCH PROVIDED WITH AT LEAST ONE OF SUCH END BEARINGS

(75) Inventors: Hirobumi Shirataki; Hirofumi Ogata, both of Shizuoka-ken (JP)

(73) Assignee: NSK-Warner K.K., Tokyo (JP)

(*) Notice: Subject to any disclaimer, the term of this patent is extended or adjusted under 35 U.S.C. 154(b) by 1 day.

(21) Appl. No.: 09/725,051

(22) Filed: Nov. 29, 2000

(30) Foreign Application Priority Data

Nov. 30, 1999 (JP) ............................. 11-376172

(51) Int. Cl.⁷ ..................... F16D 41/07; F16D 13/74
(52) U.S. Cl. ............. 192/45.1; 192/110 B; 192/113.32; 384/293
(58) Field of Search ................. 192/45.1, 113.32, 192/110 B; 384/284, 285, 293

(56) References Cited

U.S. PATENT DOCUMENTS

| | | | | |
|---|---|---|---|---|
| 1,882,956 A | * | 10/1932 | Sandler | 384/293 |
| 2,757,055 A | * | 7/1956 | Davis | 384/293 |
| 3,909,087 A | * | 9/1975 | Cairns | 384/293 |
| 4,105,267 A | * | 8/1978 | Mori | 384/291 |
| 5,601,175 A | | 2/1997 | Kinoshita et al. | 192/113.32 |
| 5,671,836 A | * | 9/1997 | Shirataki et al. | 192/113.32 |
| 6,095,690 A | * | 8/2000 | Niegel et al. | 384/293 |
| 6,253,724 B1 | * | 7/2001 | Han | 123/193.2 |

FOREIGN PATENT DOCUMENTS

JP 8-68430 3/1996

* cited by examiner

Primary Examiner—Rodney H Bonck
(74) Attorney, Agent, or Firm—Crowell & Moring LLP

(57) ABSTRACT

An end bearing for a one-way clutch provided with non-through-holes on at least one of its inner peripheral wall and outer peripheral wall. These non-through-holes are arranged on and along plural imaginary lines, for example, straight or curved lines, which extend at a predetermined angle relative to a circumferential direction of the at least one peripheral wall. Also disclosed are a one-way clutch provided with one or two of such end bearings and a manufacturing process of such end bearing.

6 Claims, 7 Drawing Sheets

END BEARINGS FOR ONE-WAY CLUTCH, MANUFACTURING PROCESS THEREOF, AND ONE-WAY CLUTCH PROVIDED WITH AT LEAST ONE OF SUCH END BEARINGS

BACKGROUND OF THE INVENTION a) Field of the invention

This invention relates to end bearings for a one-way clutches, a manufacturing process thereof, and a one-way clutch provided with at least one of such end bearings.

b) Description of the Related Art

FIG. 7 is an axial cross-sectional view of one example of one-way clutch assemblies. Arranged between an inner ring 12 and an outer ring 13 are sprags 21, a ribbon spring 22 urging the sprags 21, and cages 23, 24 holding the sprags 21 and the ribbon spring 22 in place. End bearings 1, 1 are arranged on axially opposite sides of these sprags, ribbon spring and cages. The end bearings 1, 1 has a function to prevent occurrence of minute eccentricity which would otherwise take place between the inner ring 12 and the outer ring 13 due to vibrations from an engine or the like, and hence, to protect the sprags 21 and the ribbon spring 22. Further, retainer plates 14, 14 are also arranged on axially outer sides of the respective end bearings 1, 1. These retainer plates 14, 14 are maintained in sliding contact with their corresponding counterpart members 15, 15 via thrust bearings 16, 16, respectively. Designated at numeral 17 is an oilway formed through the inner ring 12 to supply lube oil into a space in which the sprags 21 are arranged.

With reference to FIG. 8 through FIG. 10, the right-hand end bearing 1 will be described. FIG. 8 is an axial cross-sectional view of the right-hand end bearing 1. The end bearing 1 has an outer peripheral wall 4, an inner peripheral wall 3 and a holding portion 5. The outer peripheral wall 4 is formed by an outer peripheral flange and is arranged in contact with an inner periphery of the outer ring 13, while the inner peripheral wall 3 is formed by an inner peripheral flange and is arranged in contact with an outer periphery of the inner ring 12. Incidentally, FIG. 9 shows the right-hand end bearing 1 as viewed in the direction of arrow A of FIG. 8, and FIG. 10 illustrates the right-hand end bearing 1 as viewed in the direction of arrow B of FIG. 8.

As the end bearings 1, 1 are maintained in sliding contact with the inner ring 12 and the outer ring 13, it is necessary to supply lube oil to avoid occurrence of seizure. However, the end bearings 1, 1 are arranged to prevent occurrence of minute eccentricity which would otherwise take place between the inner ring 12 and the outer ring 13, so that a clearance between the inner ring 12 and the outer ring 13 is set small. This small clearance makes it difficult to supply lube oil, or tends to develop viscous resistance. With a view to overcoming this problem, some constructions have been invented, including a construction in which as shown in FIG. 11, spiral grooves 8 are formed on an inner peripheral wall 3 to assure a flow of lube oil on and along the inner peripheral wall 3 and another construction in which as illustrated in FIG. 12, dynamic pressure producing recesses 9 are formed on an inner peripheral wall 3 to avoid occurrence of viscous resistance by lube oil.

However, the arrangement of the above-described grooves 8 or dynamic pressure producing recesses 9 reduces the area of contact with the inner ring 12 or the outer ring 13, so that the local bearing stress becomes somewhat higher. Under some stringent use conditions such as high vibrations and/or a high circumferential speed, a problem is expected to arise in strength.

SUMMARY OF THE INVENTION

An object of the present invention is, therefore, to provide an end bearing at low cost for a one-way clutch, which end bearing hardly produces local bearing stress while reducing drag torque associated with the viscosity of lube oil and also maintaining lubricity.

Another object of the present invention is to provide a one-way clutch provided with one or two of such end bearings.

A further object of the present invention is to provide a process for manufacturing such end bearings are low cost.

To achieve the above-described objects, the present invention, in one aspect thereof, provides an end bearing for a one-way clutch, said end bearing being provided with non-through-holes on at least one of an inner peripheral wall and outer peripheral wall thereof, wherein the non-through-holes are arranged on and along plural imaginary lines extending at a predetermined angle relative to a circumferential direction of said at least one peripheral wall. The non-through-holes may preferably be minute non-through-holes each of which has a diameter in a range of from 0.1 to 0.4 mm. As advantages of these end bearings, they are low in drag torque and excellent in lubricity, and they hardly produce local bearing stress.

In another aspect of the present invention, the present invention also provides a one-way clutch comprising sprags and two end bearings as described above. These end bearings are arranged on axially opposite sides of the sprags, respectively, such that plural imaginary lines, on and along which non-through-holes of one of the end bearings are arranged, and plural imaginary lines, on and along which non-through-holes of the other end bearing are arranged, all extend in the same direction. This one-way clutch allows to use end bearings of the same type as the bearings to be arranged on the axially opposite sides of the sprags. This can bring about an advantage that manufacture of defective products, such as misassembling or assembling in an opposite direction, can be avoided.

In a further aspect of the present invention, there is also provided a one-way clutch comprising an end bearing as described above and an inner ring with an opening of an oilway formed at a sliding surface thereof with the end bearing. This one-way clutch is provided with a wider area of contact with sprags. Bearing stress is thus reduced, thereby making it possible to use fewer sprags.

In a still further aspect of the present invention, there is also provided a manufacturing process of an end bearing as described above for a one-way clutch, which comprises machining non-through-holes concurrently with formation of the end bearing on a press. This manufacturing process has an advantage that the end bearing can be produced at low cost.

In the one-way clutch having the inner ring with the opening of the oilway formed at the sliding surface thereof with the end bearing, the end bearing is arranged on one side of its sprags. It is to be noted that a second end bearing can be additionally arranged on the opposite side of the sprags.

DETAILED DESCRIPTION OF THE INVENTION AND PREFERRED EMBODIMENTS

Figure 1:
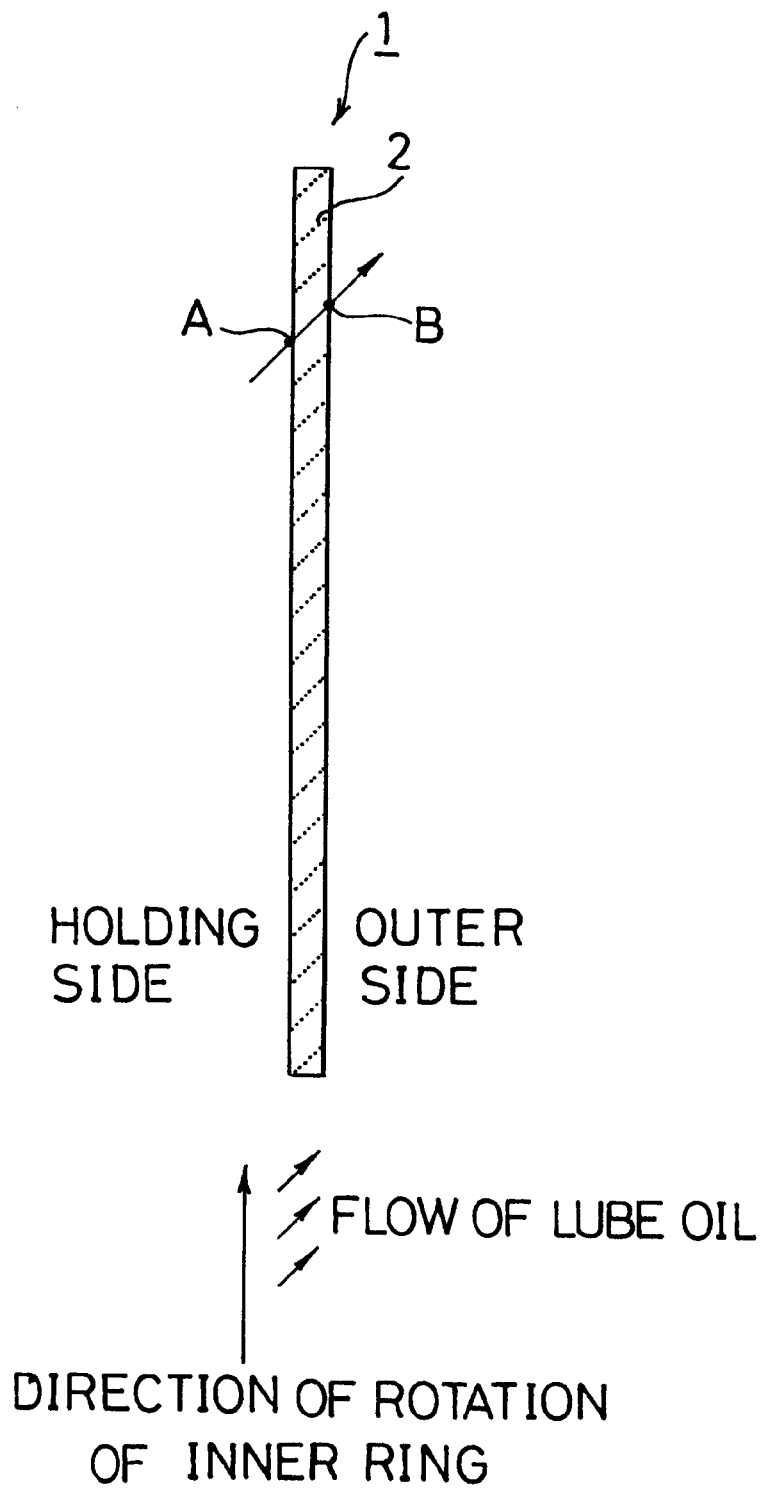
FIG. 1 is a development view of an end bearing according to a first embodiment of the present invention.
Figure 2:
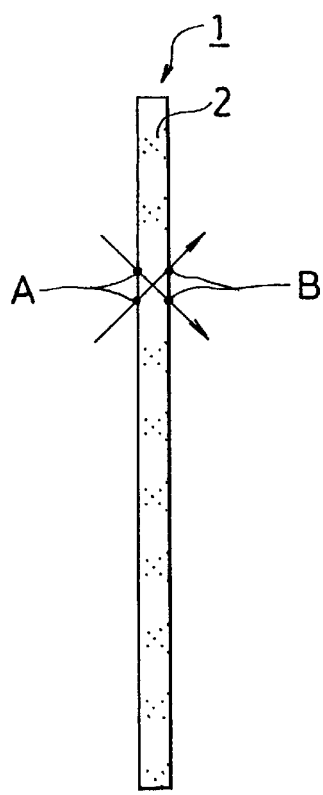
FIG. 2 is a development view of an end bearing according to a second embodiment of the present invention.
Figure 3:
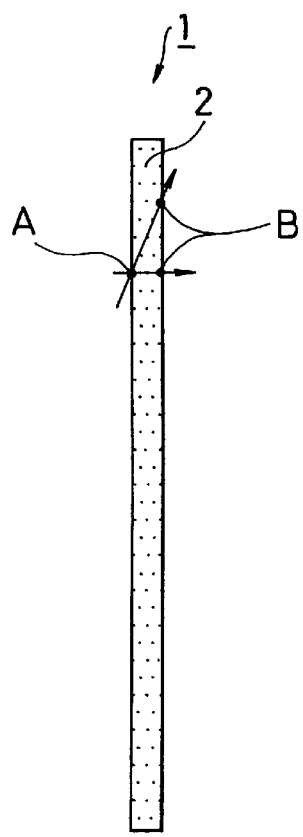
FIG. 3 is a development view of an end bearing according to a third embodiment of the present invention.

The expression "arranged on and along plural imaginary lines extending at a predetermined angle relative to a circumferential direction of said at least one peripheral wall" as used herein means that, as is illustrated in FIG. 1 through FIG. 3, plural imaginary lines which connect non-through-holes arranged most adjacent to each other intersect opposite edges which define an inner peripheral wall or an outer peripheral wall and extend in a circumferential direction (in other words, have points A, B in the drawings). These imaginary lines include not only straight lines but also curved lines. In the case of curved lines, the above expression means that curved lines which connect non-through-holes arranged most adjacent to each other intersect opposite edges, which define an inner peripheral wall or an outer peripheral wall and extend in a circumferential direction, when the curved lines are extended at their own curvatures or while maintaining the same rates of changes in curvature.

No particular limitation is imposed on the diameter or depth of the non-through-holes or on the specific arrangement of the non-through-holes. For example, non-through-holes each of which has a diameter preferably in a range of from 0.1 to 0.4 mm, notably of about 0.2 mm are formed on at least one of an inner peripheral wall or outer peripheral wall of an end bearing such that said non-through-holes are arranged on and along plural imaginary lines extending at a predetermined angle relative to a circumferential direction of said at least one peripheral wall. Specific examples of arrangements of the non-through-holes can include three types of arrangements, that is, an arrangement in a spiral form, an arrangement in X patterns, and an arrangement in a pattern evenly distributed on the entire peripheral wall.

Upon assembling a one-way clutch, it is preferred to arrange two end bearings on axially opposite sides of sprags, one on each side, such that plural imaginary lines, on and along which non-through-holes of one of the end bearings are arranged, and plural imaginary lines, on and along which non-through-holes of the other end bearing are arranged, all extend in the same direction.

Referring next FIG. 1 through FIG. 6, the first to third embodiments of the present invention will hereinafter be described. As the overall construction of the one-way clutch assembly is the same as that of the conventional one-way clutch assembly, those parts of the one-way clutch which are the same as or equivalent to corresponding parts in FIGS. 7 through 12 are shown by the same reference numerals.

Figure 7:
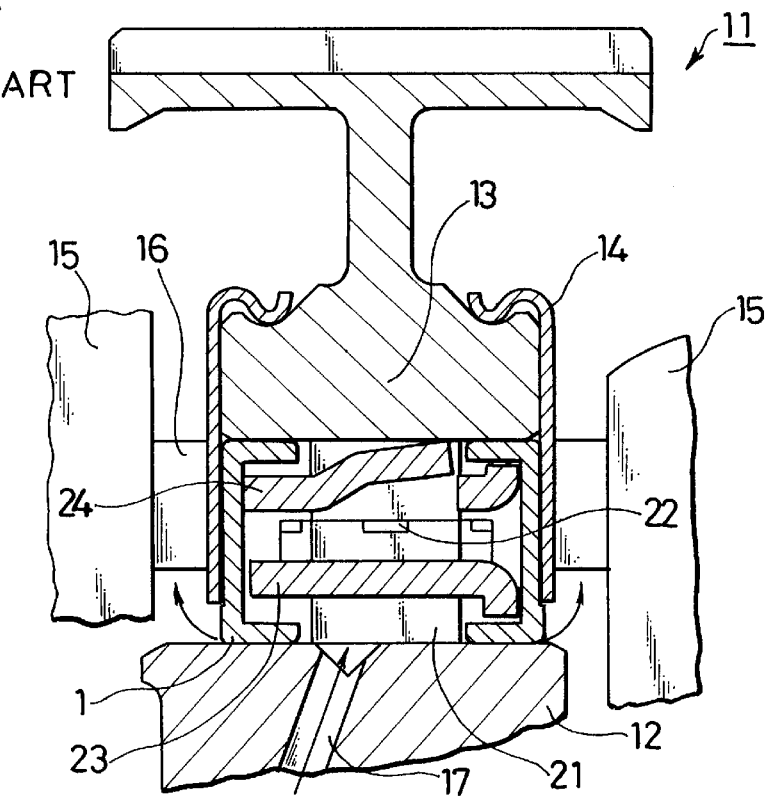
FIG. 7 is an axial fragmentary cross-sectional view showing one example of conventional one-way clutch assemblies.
Figure 8:
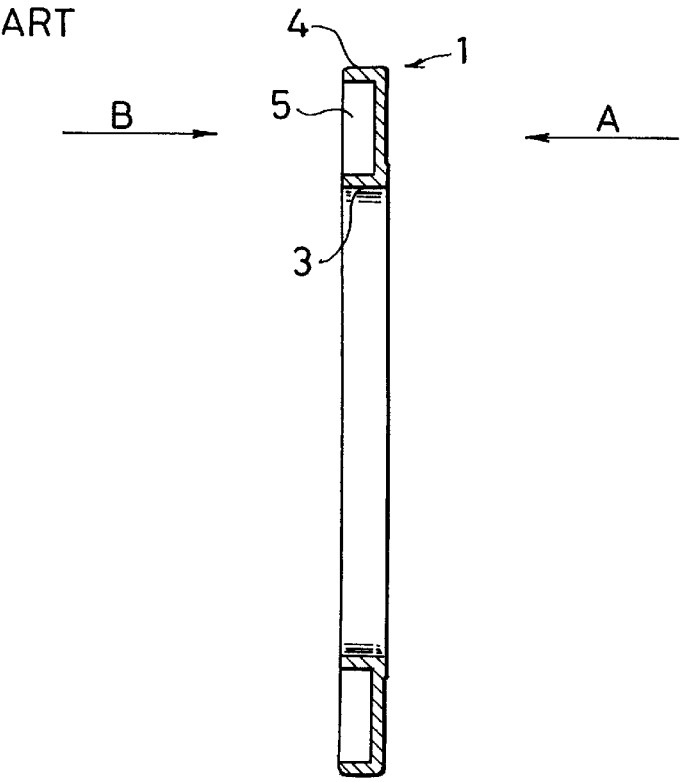
FIG. 8 is an axial cross-sectional view of a conventional end bearing.
Figure 9:
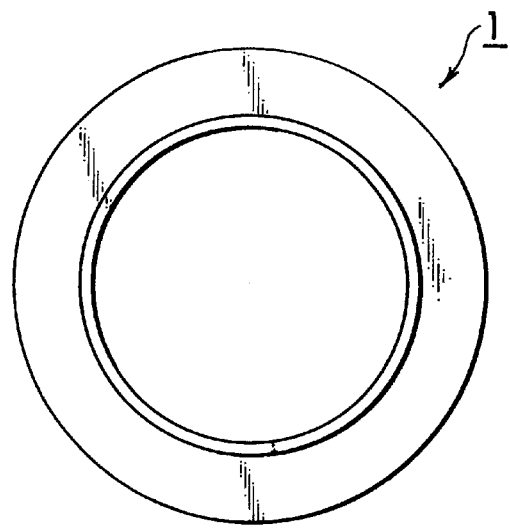
FIG. 9 is a side view of the conventional end bearing as viewed in the direction of arrow A of FIG. 8.
Figure 10:
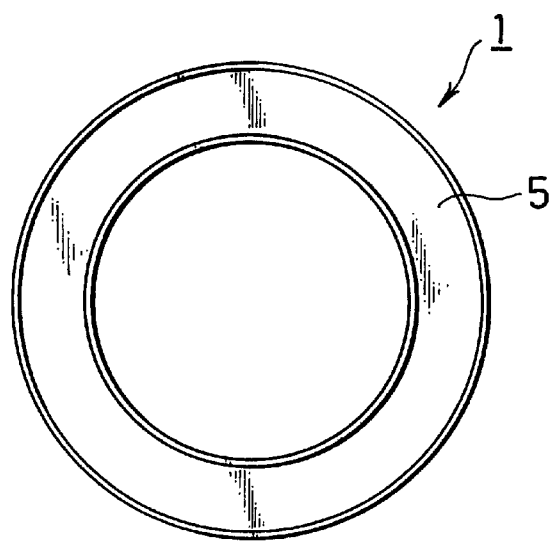
FIG. 10 is a side view of the conventional end bearing as viewed in the direction of arrow B of FIG. 8.
Figure 11:
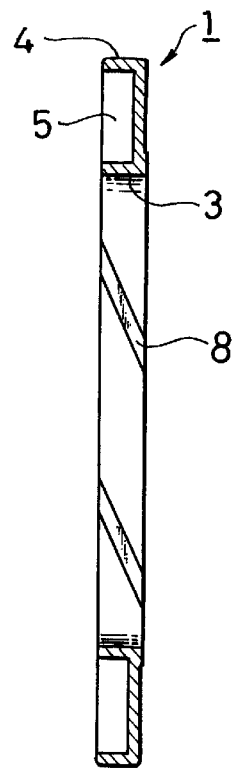
FIG. 11 is an axial cross-sectional view of a conventional end bearing with grooves formed thereon.
Figure 12:
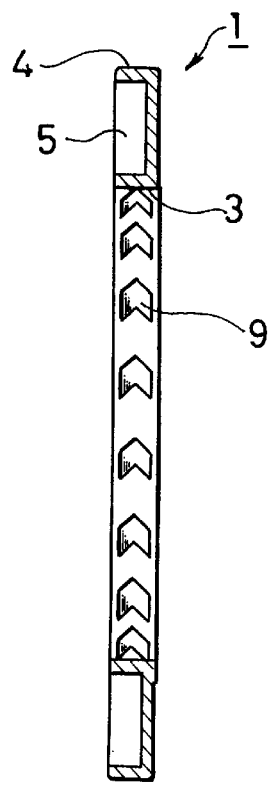
FIG. 12 is an axial cross-sectional view of a conventional end bearing with dynamic pressure producing recesses formed thereon.

FIG. 1 through FIG. 3 illustrate different arrangements of non-through-holes, respectively. In FIG. 1, non-through-holes 2 are arranged in a spiral form on and along imaginary lines. The inclination of the spiral to the circumferential direction, that is, the angle of the respective imaginary lines relative to the circumferential direction is set such that lube oil is facilitated to enter the non-through-holes so arranged. Now assume, for example, that the left side in FIG. 1 is a side on which sprags 21 and the like are held in place and the right side in FIG. 1 is an outer side and further that as is shown in FIG. 7, lube oil is supplied through an oilway 17 from the side on which the sprags 21 and the like are held in place. When an inner ring 12 is rotated relative to the end bearings in an upward direction as shown in FIG. 1, the lines on and along which the non-through-holes are arranged extend at an inclination. In FIG. 2, non-through-holes are arranged in X patterns. This arrangement facilitates entry of lube oil into the non-through-holes 2 no matter in which one of normal and reverse directions the inner ring 12 and the outer ring 13 rotate. In FIG. 3, non-through-holes are arranged evenly on the whole inner or outer peripheral wall. This arrangement is more effective for avoiding occurrence of local bearing stress.

Figure 4:
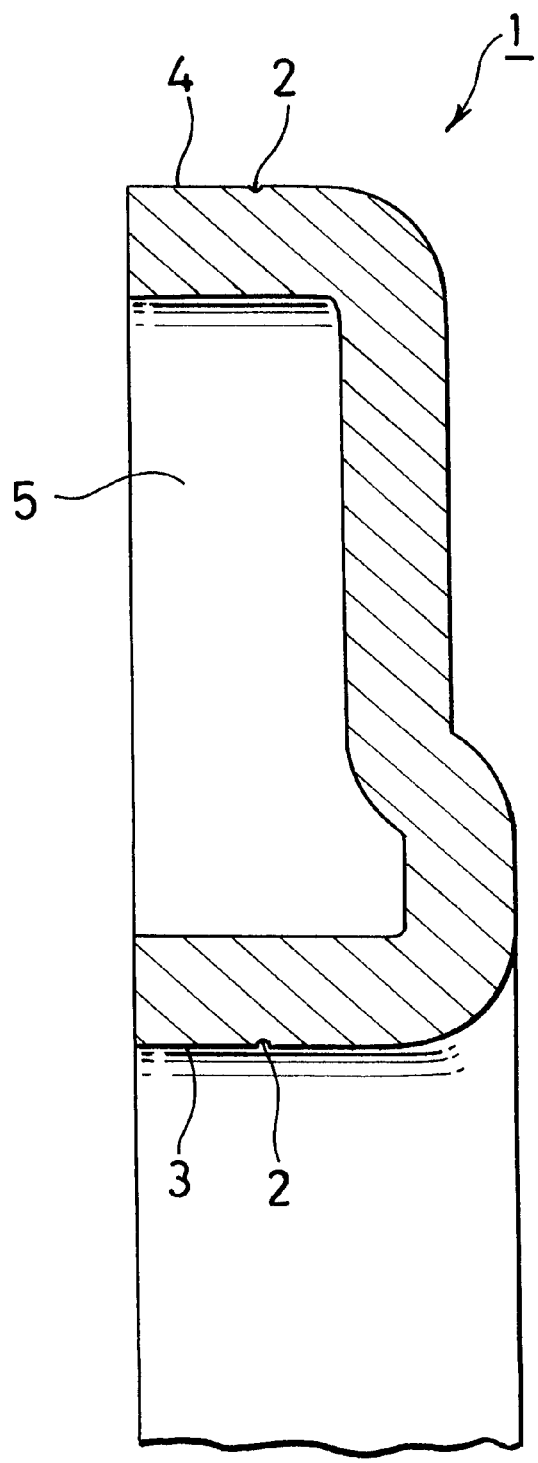
FIG. 4 is an axial fragmentary cross-sectional view of a one-way clutch provided with an end bearing according to the present invention, for example, the end bearing of FIG. 1.

With reference to FIG. 4, details of the non-through-holes 2 will next be described. As is illustrated in this drawing, the non-through-holes 2 are very small. The formation of the non-through-holes 2 in such minute dimensions has made it hard to produce local bearing stress.

Figure 5:
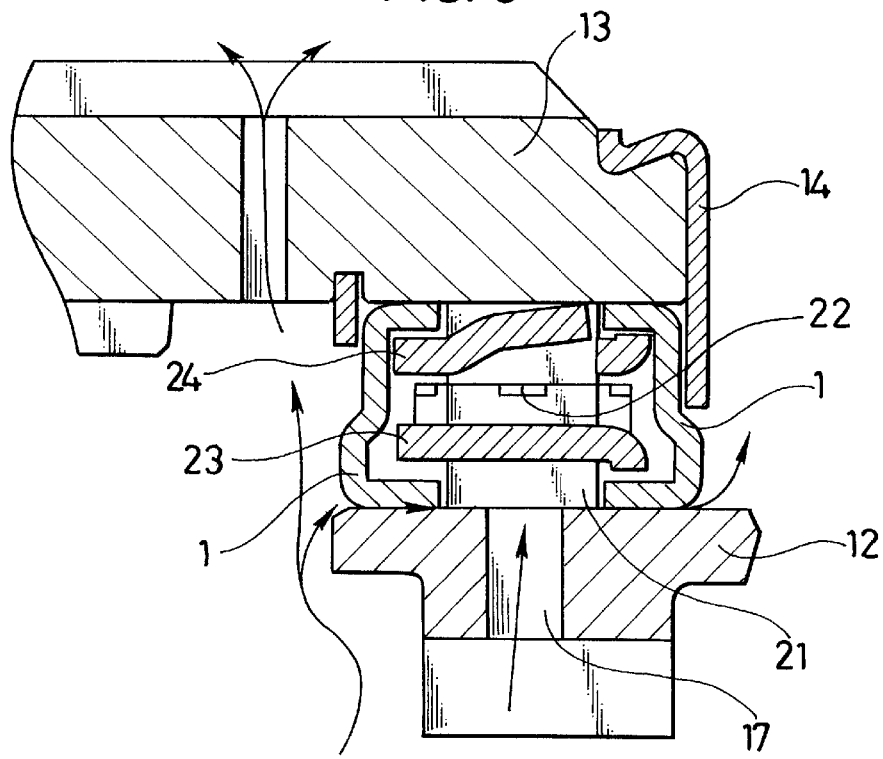
FIG. 5 is an axial fragmentary cross-sectional view showing one example of one-way clutch assemblies according to the present invention, which is provided with end bearings according to the present invention, for example, two end bearings of the same type as that of FIG. 1 arranged on axially opposite sides of sprags, respectively.
Figure 6:
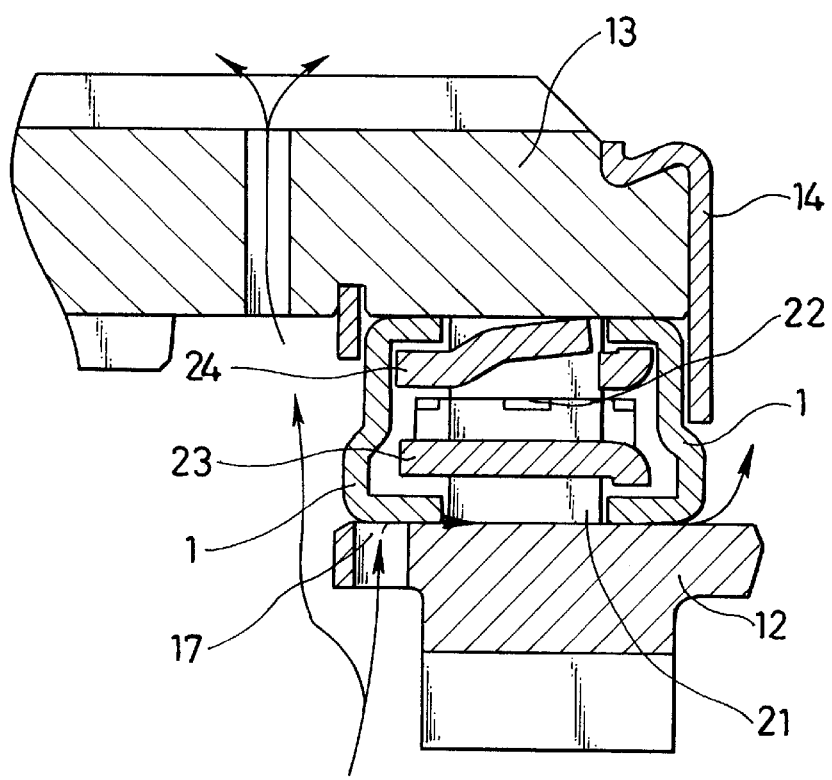
FIG. 6 is an axial fragmentary cross-sectional view showing another example of the one-way clutch assemblies according to the present invention, which is similar to the one-way clutch assembly shown in FIG. 5 except that an opening of an oilway formed through an inner ring is located at a different position.

Examples of one-way clutch assemblies according to the present invention will now be described with reference to FIG. 5 and FIG. 6. Description of these one-way clutch assemblies is omitted herein, because similar in basic construction to the conventional one-way clutch assembly depicted in FIG. 7 although they are different interalia in the shape of the outer ring 13. As described above, the one-way clutch assemblies of FIG. 5 and FIG. 6 are different from each other in the positions of the openings of their oilways 17. In the one-way clutch assembly shown in FIG. 5, the opening of the oilway 17 is arranged at the raceway of the inner ring 12 of the one-way clutch, namely, at the wall of the inner ring 12, said wall being maintained in contact with sprags 21. In the one-way clutch assembly depicted in FIG. 6, on the other hand, the opening of the oilway 17 is arranged at the wall of the inner ring 12. In each of FIG. 5 and FIG. 6, the non-through-holes 2 formed on the end bearings 1, 1, which are arranged on the opposite sides of the sprags, respectively, are arranged on the plural imaginary lines which extend in the same direction. Lube oil is therefore caused to flow through spaces in which the end bearings 1, 1 are arranged, respectively, and also through a space in which the sprags 21 held by the end bearings 1, 1 are arranged, as indicated by arrows in FIG. 5 or FIG. 6. In each of the one-way clutch assemblies shown in FIG. 5 and FIG. 6, the end bearings are arranged on the opposite sides of the sprags, respectively. However, the one-way clutch assembly may be provided on only one side of the sprags 21 with an end bearing.

It is efficient to concurrently form the non-through-holes 2 upon forming the end bearing 1 by pressing. Namely, it is desirous to form the non-through-holes 2 concurrently with punching the end bearing 1 in the form of a ring.

What is claimed is:

1. An end bearing for a one-way clutch, said end bearing being provided on at least one of an inner peripheral wall and outer peripheral wall thereof, with non-through-holes arranged on and along plural imaginary lines extending at a predetermined angle relative to a circumferential direction of said at least one peripheral wall, and wherein said non-through-holes are minute non-through-holes each of which has a diameter in a range of from 0.1 to 0.4 mm.

2. An end bearing according to claim 1, wherein said plural imaginary lines are straight lines.

3. An end bearing according to claim 1, wherein said plural imaginary lines are curved lines.

4. A one-way clutch comprising:

sprags, and two end bearings as defined in claim 1 arranged on axially opposite sides of said sprags, respectively, such that plural imaginary lines, on and along which non-through-holes of one of said end bearings are arranged, and plural imaginary lines, on and along which non-through-holes of the other end bearing are arranged, all extend in the same direction.

5. A one-way clutch comprising:

an end bearing as defined in claim 1 and an inner ring with an opening of an oilway formed at a sliding surface thereof with said end bearing.

6. A manufacturing process of an end bearing as defined in claim 1 for a one-way clutch, which comprises machining non-through-holes concurrently with formation of said end bearing on a press.

* * * * *